F. SNOW.
VALVE.
APPLICATION FILED DEC. 26, 1905.
958,021.
Patented May 17, 1910.
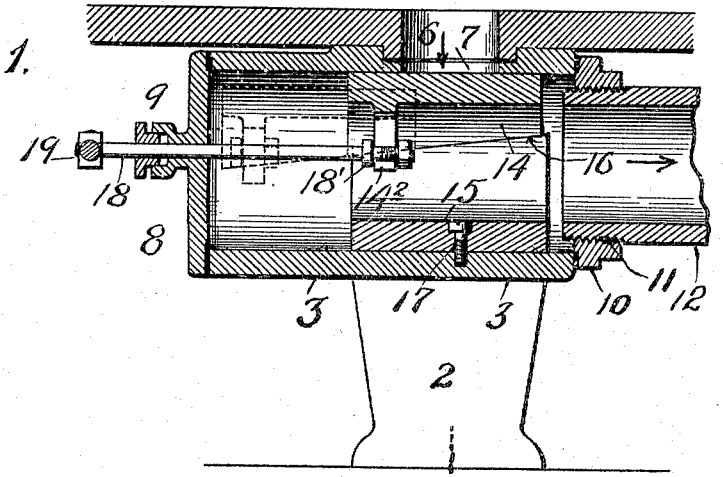
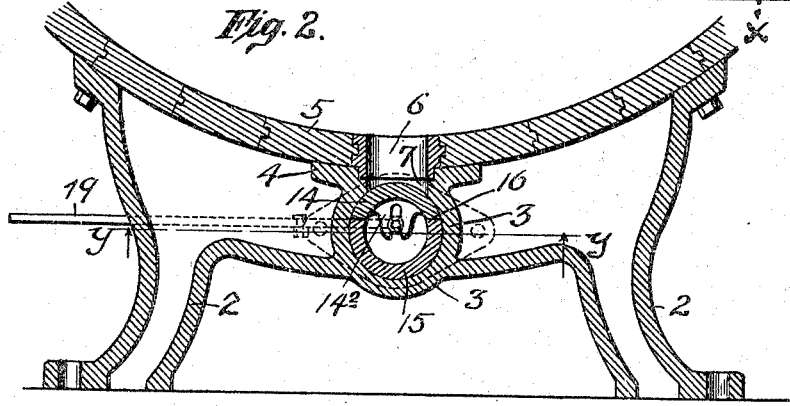
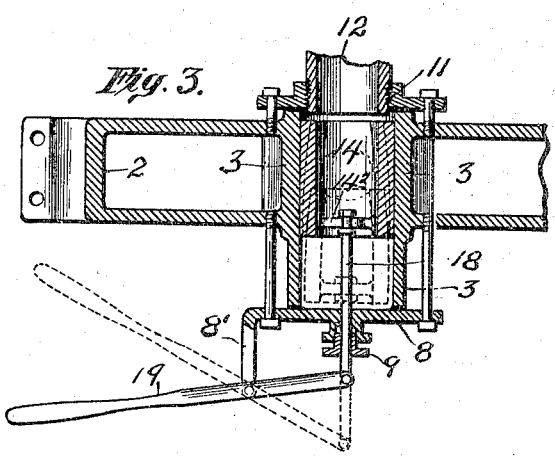
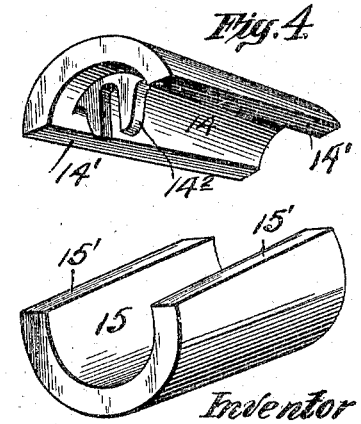
Witnesses
Inventor
Frederick Snow
by
Atty.

UNITED STATES PATENT OFFICE.

FREDERICK SNOW, OF CHICAGO, ILLINOIS, ASSIGNOR, BY MESNE ASSIGNMENTS, TO CONKLING COMPANY, OF CHICAGO, ILLINOIS, A CORPORATION OF ILLINOIS.

VALVE.

958,021.      Specification of Letters Patent.      Patented May 17, 1910.

Application filed December 26, 1905. Serial No. 293,287.

*To all whom it may concern:*

Be it known that I, FREDERICK SNOW, a citizen of the United States, and a resident of Chicago, Cook county, Illinois, have invented a certain new, useful, and Improved Valve, of which the following is a full, clear, and exact description, such as will enable others skilled in the art to which it appertains to make and use the same.

This invention relates to improvements in liquid valves of the sliding or gate valve type, and has particular reference to improvements in valves for washing machines and the like, to be used in discharging foul water and refuse matter where valves of ordinary design would become clogged and fail to close tightly.

The object of the invention is to provide an improved combined slide and drop-motion valve of a simple and economical construction, comprising few parts and which shall have only one operating member.

A further object of the invention is to provide a valve which shall be particularly fitted to meet the requirements of washing machines and the like, and to provide a valve which may be and shall be constructed as a part of a support for such machines.

A further and special object of this invention is to provide a valve which shall have no threaded operating parts and which shall act to automatically take up its own wear.

Still other objects of the invention will appear hereinafter.

The invention will be readily understood by reference to the accompanying drawings forming a part of this specification, and in which—

Figure 1 is a longitudinal, vertical section of a valve embodying my invention; Fig. 2 is a transverse, vertical section on the line X—X of Fig. 1, somewhat reduced in size and showing a washing machine cradle, which forms part of the valve; Fig. 3 is a horizontal sectional view on the line Y—Y of Fig. 2; and Fig. 4 is a perspective view of the valve proper and the coöperating part, separated to show the wedge surfaces of both.

In these drawings I have illustrated my invention in its complete form; that is, the drawings illustrate a combined machine cradle or support and drain valve. The support herein shown and whereof the valve casing forms a part, is a cradle such as is used to support the bodies or shells of rotary washing machines. Its upper part takes its form from the cylindrical shape of the washing machine and it is to be understood that my invention is not limited to a support or cradle of the exact design herein illustrated, the only essential feature being the construction or formation of the internal bore of the valve within the body which comprises the support, cradle or block, in order that the inlet opening of the valve shall be immediately adjacent to the wall of the supported receptacle or shell to communicate with a drain opening therein.

Referring now to the drawings, 2, represents the support or cradle at the middle of which is the valve casing, 3. This is preferably integral with the cradle, 2; it is smoothly bored, and is of uniform diameter throughout. The top flange, 4, of the casing merges in the top flange of the cradle and therewith provides a seat for the bottom of the washer shell or other receptacle, 5, the shell is provided with a drain opening, 6, directly above the valve casing portion of the cradle and this opening 6 registers with the inlet opening, 7, in the top thereof. One end of the valve casing is closed by a plate, 8, containing a stuffing box, 9, for the valve stem. The opposite end of the casing is closed by a plate, 10, having a threaded opening, 11, to receive the outflow or drain pipe, 12. It will be observed that the construction is such that the casing may be bored from end to end with an ordinary arbor-carried tool. The ends of the casing are simply faced off and the plates are set against the ends with suitable gaskets or packing interposed. It is obvious that this portion of the valve design may be altered without departing from the invention. Within the valve is what may be termed a lining, one part, 14, of which constitutes the valve proper, and the other part, 15, of which, provides the ways before alluded to, for supporting the valve member, 14. The initial form of this lining is a simple sleeve, usually somewhat thinner than here shown. The sleeve is made to snugly fit the valve bore, and after being turned, is cut upon a plane which makes an acute angle with the horizontal plane of the valve's axis. The plane of severence is shown by the lines, 16, in Figs.

1 and 2, indicating the meeting of the wedge surfaces, 14' and 15' of the two parts (see Fig. 4). The lower part, 15, is fastened in the casing, with any suitable means, such as a screw, 17, and this being stationary, it is obvious that the valve part, 14, may be reciprocated upon the inclined surfaces. When drawn back, the valve settles away from the inlet opening, 7, leaving the passage entirely free, and, furthermore, leaving large passages upon all sides of the part, 14, so that the top of the valve and the inclined surfaces will be cleared by the downward rush of liquid. As the valve lining is hollow, the fluid that flows back of the valve finds ready escape therethrough. When the valve part 14 is driven forward and upward upon the wedge surfaces, its top is forced across the inlet opening, the longitudinal effort causing the valve part to slide snugly to its seat and also causing the arch-like valve to spread and make firm lateral contact with the curved wall of the valve casing. As a means of operating the valve part, 14, I preferably employ a single reciprocating valve stem, 18, working through the stuffing box, 9, and actuated by a lever, 19, which latter is preferably pivoted upon a lug, 8', extending from the plate, 8. The valve stem is provided with collars or nuts, 18', which engage a slotted lug, 14², formed upon or attached to the inner crown of the valve, 14.

As it is obvious that numerous modifications will readily suggest themselves to one skilled in the art, and may be made without departing from its spirit, I do not confine my invention to the specific constructions herein shown and described.

Having thus described my invention, I claim as new, and desire to secure by Letters Patent:

1. A cylindrical washer shell in combination with the cradle supporting one end of said shell, a valve casing formed integral with said cradle and having in its top an opening communicating with said shell, a waste pipe attached to the side of said cradle and leading from said valve casing, a one piece sliding valve in said valve casing and adapted to close the opening in the top of said casing and cradle, the valve stem extending through that end of said casing which is opposite said waste pipe and an operating lever mounted on said cradle and occupying a horizontal position beneath the washer shell, substantially as described.

2. A cradle or support for a washer shell, said cradle containing in its upper portion a cylindrical, horizontal valve casing integral therewith and having an inlet opening in its top, and an outlet opening in its end, said valve casing also containing inclined ways below the opening in its top, in combination with a wedge shaped slide valve segmental in cross section, fitted to the top of said casing and slidable on said inclined ways, to open and close said inlet opening in the top of the casing, a valve stem extending from said slide valve and a lever pivoted upon the side of the cradle for operating said stem and valve, substantially as described.

3. A cradle having a curved top to receive a washer shell, in combination with a valve casing integral with said cradle and containing a horizontal cylindrical bore, said cradle having an opening in its top, communicating with said bore, means closing one end of said casing, a waste pipe connected with the other end of the casing, a cylindrical lining shorter than said casing and arranged therein beneath the opening in the top thereof, said lining being divided into a larger lower part and a smaller upper part, engaged upon inclined surfaces, the smaller part being adapted to close the opening in the cradle, means securing the lower part of the lining in the casing, a valve stem arranged in the closed head or end of the casing and loosely connected with the upper part of said lining and means upon the cradle for operating said stem and the upper part of the lining to open and close the opening in the cradle, substantially as described.

4. A cradle or support for a washer shell containing a valve casing integral therewith and having a cylindrical bore, open at one end and closed at the other, said integral casing being provided with an inlet opening in its top, in combination with a pipe fitting at the open end of the casing, a sleeve like lining for said casing fitting the same and divided into two parts by severance on a plane lying between the axis of the casing and the inlet opening thereof and forming an acute angle with said axis, the lower part of said lining being fixed in the lower part of said casing, the upper part of said lining constituting a one piece slide valve which is slidable on the lower part to open and close said inlet opening and a valve stem extending through the closed end of the casing and loosely attached to said upper, valve-forming, part of the lining, substantially as described.

In testimony whereof, I have hereunto set my hand, this 20th day of December, 1905, in the presence of two subscribing witnesses.

FREDERICK SNOW.

Witnesses:
CHARLES GILBERT HAWLEY,
CHAS. F. MURRAY.